(12) United States Patent
Kawanabe

(10) Patent No.: US 11,029,480 B2
(45) Date of Patent: Jun. 8, 2021

(54) LENS GUIDE DEVICE, LENS MOVING DEVICE, AND IMAGING APPARATUS

(71) Applicant: FUJIFILM Corporation, Tokyo (JP)

(72) Inventor: Yuichi Kawanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 278 days.

(21) Appl. No.: 16/408,135

(22) Filed: May 9, 2019

(65) Prior Publication Data
US 2019/0265432 A1 Aug. 29, 2019

Related U.S. Application Data

(63) Continuation of application No. PCT/JP2017/034440, filed on Sep. 25, 2017.

(30) Foreign Application Priority Data

Dec. 5, 2016 (JP) ............................. JP2016-235941

(51) Int. Cl.
*G02B 7/02* (2021.01)
*G02B 7/00* (2021.01)
(Continued)

(52) U.S. Cl.
CPC .............. *G02B 7/021* (2013.01); *G02B 7/003* (2013.01); *G02B 7/022* (2013.01); *G02B 7/023* (2013.01); *G02B 7/04* (2013.01); *H04N 5/2254* (2013.01)

(58) Field of Classification Search
CPC ............ G02B 7/021–023; G02B 7/003; H04N 5/2254
(Continued)

(56) References Cited

U.S. PATENT DOCUMENTS 5,162,948 A 11/1992 Horning et al.
5,305,151 A * 4/1994 Kakimoto .......... G11B 7/08582
359/814
(Continued)

FOREIGN PATENT DOCUMENTS

CN 203720509 U 7/2014
JP 5-281453 A 10/1993
(Continued)

OTHER PUBLICATIONS

International Preliminary Report on Patentability and Written Opinion of the International Searching Authority(Forms PCT/IPEA/409 and PCT/ISA/237), dated Jun. 19, 2018, for International Application No. PCT/JP2017/034440, with an English Translation.
(Continued)

*Primary Examiner* — Zachary W Wilkes
(74) *Attorney, Agent, or Firm* — Birch, Stewart, Kolasch & Birch, LLP

(57) ABSTRACT

A first rail 41 supports a first rolling body 45 so as to allow the first rolling body 45 to be rollable in a first direction parallel to an optical axis of a first focus lens. A second rail 42 supports a second rolling body 46 so as to allow the second rolling body 46 to be rollable in the first direction. The biasing mechanism 47 supports the first rolling body 45 so as to allow the first rolling body 45 to be movable in the first direction, and biases the first rolling body 45 toward the first rail 41. A third rail 43 is provided in parallel with the second rail 42. The third rail 43 supports a second rolling body 46 so as to allow the second rolling body 46 to be movable in the first direction.

12 Claims, 14 Drawing Sheets

(51) Int. Cl.
*G02B 7/04* (2021.01)
*H04N 5/225* (2006.01)
(58) Field of Classification Search
USPC .......................................................... 359/826
See application file for complete search history.

(56) References Cited

U.S. PATENT DOCUMENTS

| | | | | | |
|---|---|---|---|---|---|
| 5,644,440 | A * | 7/1997 | Akada | ...................... | G02B 7/08 |
| | | | | | 359/694 |
| 7,064,912 | B2 * | 6/2006 | Yamamoto | ............. | G02B 7/021 |
| | | | | | 359/696 |
| 7,489,458 | B2 * | 2/2009 | Su | ........................ | H04N 5/2254 |
| | | | | | 359/824 |
| 7,656,596 | B2 * | 2/2010 | Matsumoto | ............ | G02B 7/102 |
| | | | | | 359/826 |
| 8,027,106 | B2 * | 9/2011 | Kim | ....................... | G02B 7/102 |
| | | | | | 359/824 |
| 8,514,301 | B2 * | 8/2013 | Zaifrani | ................... | G03B 3/10 |
| | | | | | 348/240.3 |
| 9,395,552 | B2 * | 7/2016 | Hung | ..................... | G02B 27/646 |
| 9,397,586 | B2 * | 7/2016 | Yamasaki | ............... | H02N 2/001 |
| 9,660,556 | B2 * | 5/2017 | Yamamoto | ............. | H02N 2/006 |
| 10,222,578 | B2 * | 3/2019 | Nishitani | ................ | H01L 41/00 |
| 2010/0046101 | A1 | 2/2010 | Nakamura | | |
| 2015/0309388 | A1 | 10/2015 | Sato | | |
| 2019/0271825 | A1 * | 9/2019 | Kawanabe | ............... | G02B 7/02 |

FOREIGN PATENT DOCUMENTS

| | | |
|---|---|---|
| JP | 8-29656 A | 2/1996 |
| JP | 8-86949 A | 4/1996 |
| JP | 2007-271889 A | 10/2007 |
| JP | 2009-124842 A | 6/2009 |
| JP | 2010-48984 A | 3/2010 |
| JP | 2013-54189 A | 3/2013 |
| JP | 2014-48319 A | 3/2014 |
| JP | 2015-81992 A | 4/2015 |
| JP | 2015-210409 A | 11/2015 |

OTHER PUBLICATIONS

International Search Report (form PCT/ISA/210), dated Dec. 26, 2017, for International Application No. PCT/JP2017/034440, with an English translation.

Chinese Office Action and Search Report for Chinese Application No. 201780075397.2, dated Nov. 25, 2020, with English translation of the Office Action.

* cited by examiner

LENS GUIDE DEVICE, LENS MOVING DEVICE, AND IMAGING APPARATUS

CROSS-REFERENCE TO RELATED APPLICATIONS

This application is a Continuation of PCT International Application No. PCT/JP2017/034440 filed on Sep. 25, 2017, which claims priority under 35 U.S.C § 119(a) to Japanese Patent Application No. 2016-235941 filed on Dec. 5, 2016. Each of the above application(s) is hereby expressly incorporated by reference, in its entirety, into the present application.

BACKGROUND OF THE INVENTION

1. Field of the Invention

The present invention relates to a lens guide device, a lens moving device, and an imaging apparatus.

2. Description of the Related Art

A lens moving device, which moves a lens group at the time of an operation for changing a magnification or a focusing operation, is mounted on an imaging apparatus, such as a digital camera, or an optical device, such as a lens barrel (for example, see JP2015-210409A and JP1996-086949A (JP-H08-086949A)).

In a lens moving device disclosed in JP2015-210409A, a lens frame 101 is held by a pair of first and second guide members 102 and 103 parallel with each other as shown in FIG. 14(A) and FIG. 14(B).

Further, the lens frame 101 is moved in the longitudinal direction of these guide members 102 and 103 to change the position of a lens 106 in an optical axis direction and to perform an operation for changing a magnification or a focusing operation. In this case, the lens frame 101 is biased toward one guide member, for example, the second guide member 103 by, for example, a coil spring (not shown) so that the lens frame 101 is guided by the guide members 102 and 103 without rattling.

Since the rolling of balls is used to move an optical holding member in an optical axis direction in an optical device disclosed in JP1996-086949A (JP-H08-086949A), the oscillation of a lens, which is being moved, is suppressed.

SUMMARY OF THE INVENTION

As shown in FIG. 14(A), the lens frame 101 in the related art includes a guide barrel 105. The guide barrel 105 includes a guide hole 105A, and the first guide member 102 is inserted into the guide hole 105A. A gap G1 is formed between the guide hole 105A and the first guide member 102 to smoothly move the lens frame 101 by the first guide member 102.

The gap G1 can secure the smooth movement of the lens frame 101, but the lens frame 101 is inclined in the range of the gap G1. For this reason, there is a problem that the position of the held lens 106 in the optical axis direction is shifted as shown in FIG. 14(B) in a case where the lens frame 101, which is being moved, is to be stopped on the basis of the detection signal of a sensor detecting the position of the lens frame 101. For example, the inclination of the lens frame 101 in a state immediately after movement/stop shown in FIG. 14(B) is different from that in a subsequent stop state shown in FIG. 14(A) due to the gap G1 of the lens frame 101. Due to this inclination, the position of the held lens 106 in the optical axis direction is shifted by the amount PS of shift.

In the lens moving device disclosed in JP2015-210409A, the coil spring is used to bias the lens frame 101 in a direction orthogonal to the guide members 102 and 103 to remove rattling. However, the sliding resistance of the lens frame 101 during movement is increased as much as the rattling is removed. For this reason, there is a problem that a lens driving device is increased in size since a driving force required to move the lens frame 101 is increased. Further, even though the lens frame 101 is biased by the coil spring, an inclination between the time of movement of the lens frame 101 and the time of stop of the lens frame 101 cannot be completely removed. For this reason, there is a problem that a shift in the position of the lens in the optical axis direction remains.

In an optical device disclosed in JP1996-086949A (JP-H08-086949A), balls are provided between a lens frame and a guide member and the lens frame is movably held by a rolling of the balls. Accordingly, an inclination at the time of movement and stop of the lens frame is removed. However, since the balls are disposed on both sides of an optical axis, a guide mechanism using the balls is increased in size. For this reason, it is difficult to make the entire device compact. Further, since an effect caused by rolling is not obtained in a case where the positions of a lens and the balls are vertically inverted, the lens cannot be smoothly guided. Accordingly, there is a problem that the lens cannot be smoothly moved due to a difference in attitude in a case where imaging is performed in various modes where the direction of an imaging apparatus varies.

The invention provides a lens guide device, a lens moving device, and an imaging apparatus that can remove the inclination of a lens frame at the time of movement and stop and can accurately position the lens frame even though an attitude, such as an imaging direction, is changed.

A lens guide device according to the invention comprises a lens frame that holds a lens, a first guide unit, and a second guide unit. The first guide unit is provided on the lens frame and movably supports the lens frame in a first direction parallel to an optical axis of the lens. The second guide unit is provided on the lens frame at a position spaced from the first guide unit and movably supports the lens frame in the first direction parallel to the optical axis of the lens. The first guide unit and the second guide unit include a first guide member, a first rolling body, a second guide member, a second rolling body, a third guide member, a fourth guide member, and a biasing mechanism. The first guide member is provided on the lens frame in the first direction parallel to the optical axis of the lens. The first rolling body is moved while being in contact with the first guide member. The second guide member is parallel to the first guide member and is provided on the lens frame on a side opposite to the first rolling body so as to be close to the first guide member. The second rolling body is moved while being in contact with the second guide member. The third guide member is provided in parallel with the second guide member and supports the second rolling body so as to allow the second rolling body to be movable in the first direction. The fourth guide member is provided in parallel with the first guide member and supports the first rolling body so as to allow the first rolling body to be movable in the first direction. The biasing mechanism biases one of the first and second rolling bodies toward the other of the first and second rolling bodies.

It is preferable that at least one of the first guide member, the second guide member, the third guide member, or the fourth guide member is a flat plate-like guide member or a guide member with a guide groove and each of the other guide members is two parallel guide shafts.

It is preferable that one of the first rolling body and the second rolling body is two spheres that are provided so as to be spaced from each other in the first direction, the other of the first rolling body and the second rolling body is at least one sphere that is provided between the two spheres when the first rolling body and the second rolling body are viewed in a second direction that is a direction which is orthogonal to the first direction and in which the first guide member and the second guide member are arranged, and the lens guide device further comprises a restricting protrusion. It is preferable that each of the first rolling body and the second rolling body is two spheres that are provided so as to be spaced from each other in the first direction and the lens guide device further comprises a restricting protrusion. The restricting protrusion is provided between the two spheres and restricts the movement of the two spheres beyond a predetermined range in the first direction.

It is preferable that the lens guide device further comprises a holding barrel in which the biasing mechanism and the third guide member are provided and which holds the lens frame therein.

A lens moving device according to the invention comprises the lens guide device and a lens driving mechanism. The lens driving mechanism is provided in the holding barrel and moves the lens frame in an optical axis direction. It is preferable that the lens driving mechanism is a voice coil motor or a stepping motor that includes a screw rod screwed with the lens frame. Further, it is preferable that the lens driving mechanism performs initialization for returning the lens frame to a reference position that is one end of the predetermined range.

An imaging apparatus according to the invention comprises an imaging unit and the lens moving device that forms an object image on the imaging unit.

According to the invention, it is possible to remove the inclination of a lens frame at the time of movement and stop and to accurately position the lens frame even though an attitude, such as an imaging direction, is changed.

DESCRIPTION OF THE PREFERRED EMBODIMENTS

Figure 1:
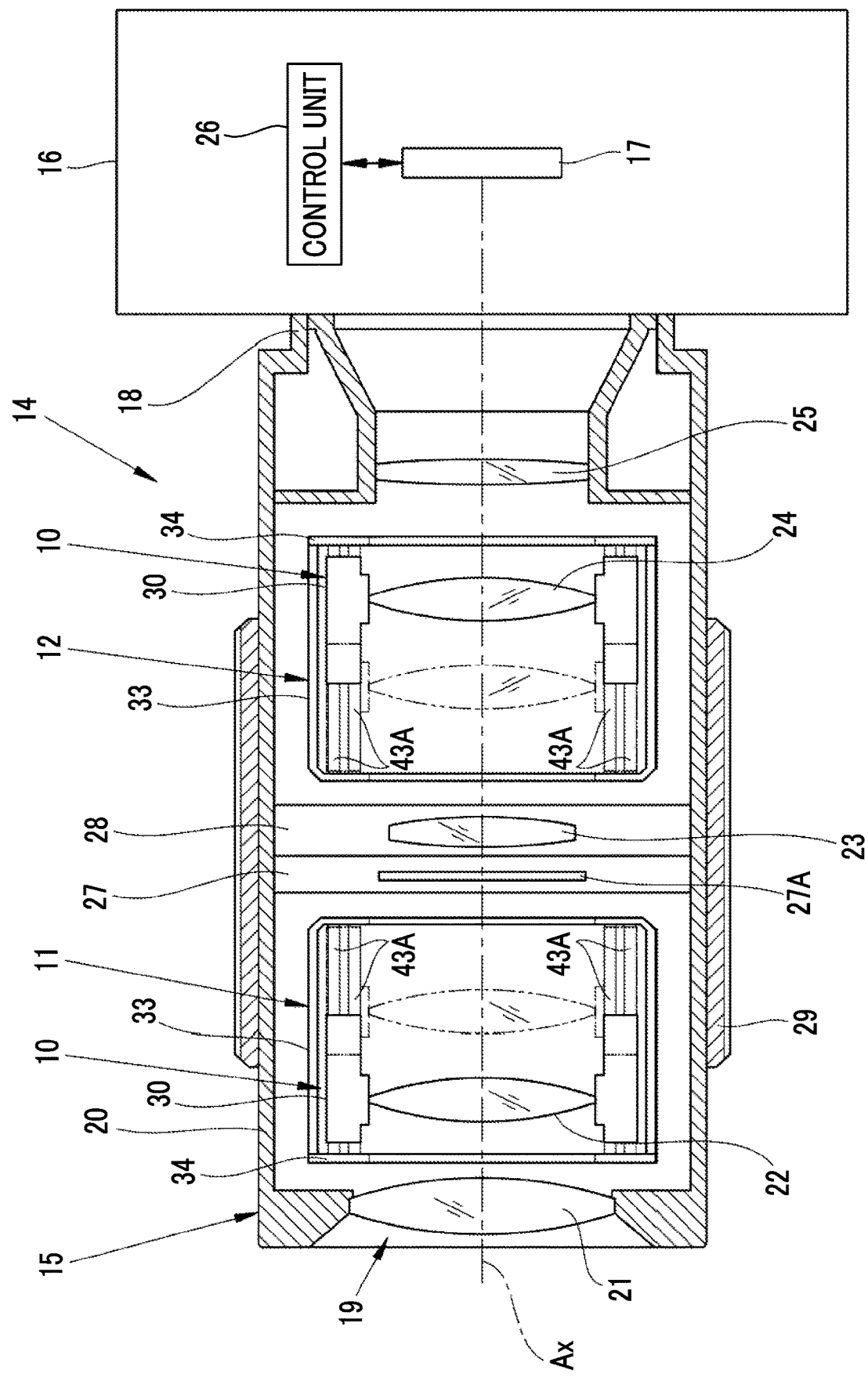
FIG. 1 is a cross-sectional view showing the schematic structure of an imaging apparatus according to an embodiment of the invention.

As shown in FIG. 1, an imaging apparatus 14 using lens guide devices 10 and lens moving devices 11 and 12 according to embodiments of the invention includes a lens unit 15 and a camera body 16 as an imaging unit. The lens unit 15 is formed as an interchangeable lens unit, and forms an object image on an imaging element 17 provided in the camera body 16. The lens unit 15 includes a connector 18 that is attachable to and detachable from the camera body 16. The lens unit 15 may be integrated with the camera body 16.

The lens unit 15 comprises an optical system 19 in a lens barrel member 20. The optical system 19 includes, for example, first to fifth lenses 21 to 25 that are provided in this order from an object side along an optical axis Ax. Each of the first to fifth lenses 21 to 25 is schematically shown as one lens, but may be a plurality of lens groups.

The camera body 16 comprises the imaging element 17 that takes an optical image of an object obtained through the optical system 19. A control unit 26 inputs information about various imaging conditions, such as an imaging timing, to the imaging element 17, and receives image signals that are taken by and output from the imaging element 17. Then, the control unit 26 performs analog processing and digital processing on the received image signals and generates taken image data to be output.

A first lens moving device 11 as a first focus mechanism, a stop mechanism 27, a vibration-proof mechanism 28, and a second lens moving device 12 as a second focus mechanism are provided in the lens barrel member 20 in this order from the object side.

A focus ring 29 is rotatably mounted on the outer periphery of the lens barrel member 20. In a case in which focusing is manually performed, for example, a first focus lens 22 as the second lens and a second focus lens 24 as the fourth lens are individually moved in a first direction parallel to the optical axis Ax according to the rotation of the focus ring 29 when the focus ring 29 is rotated. The first focus lens 22 and the second focus lens 24 are provided at predetermined positions corresponding to imaging distances on the optical axis by this movement of the first focus lens 22 and the second focus lens 24, so that focusing is completed.

The first lens 21 and the fifth lens 25 are mounted on the lens barrel member 20. The first lens 21 is fixed to the front end portion (object side) of the lens barrel member 20. Further, the fifth lens 25 is fixed to the rear end portion (imaging element side) of the lens barrel member 20. The first focus lens 22 as the second lens, a blur-correction lens 23 as the third lens, and the second focus lens 24 as the fourth lens are respectively movable lenses.

The first focus lens 22 is driven by the first lens moving device 11 and is moved in the direction of the optical axis Ax (optical axis direction). The second focus lens 24 is driven by the second lens moving device 12 and is moved in the optical axis direction.

Figure 2:
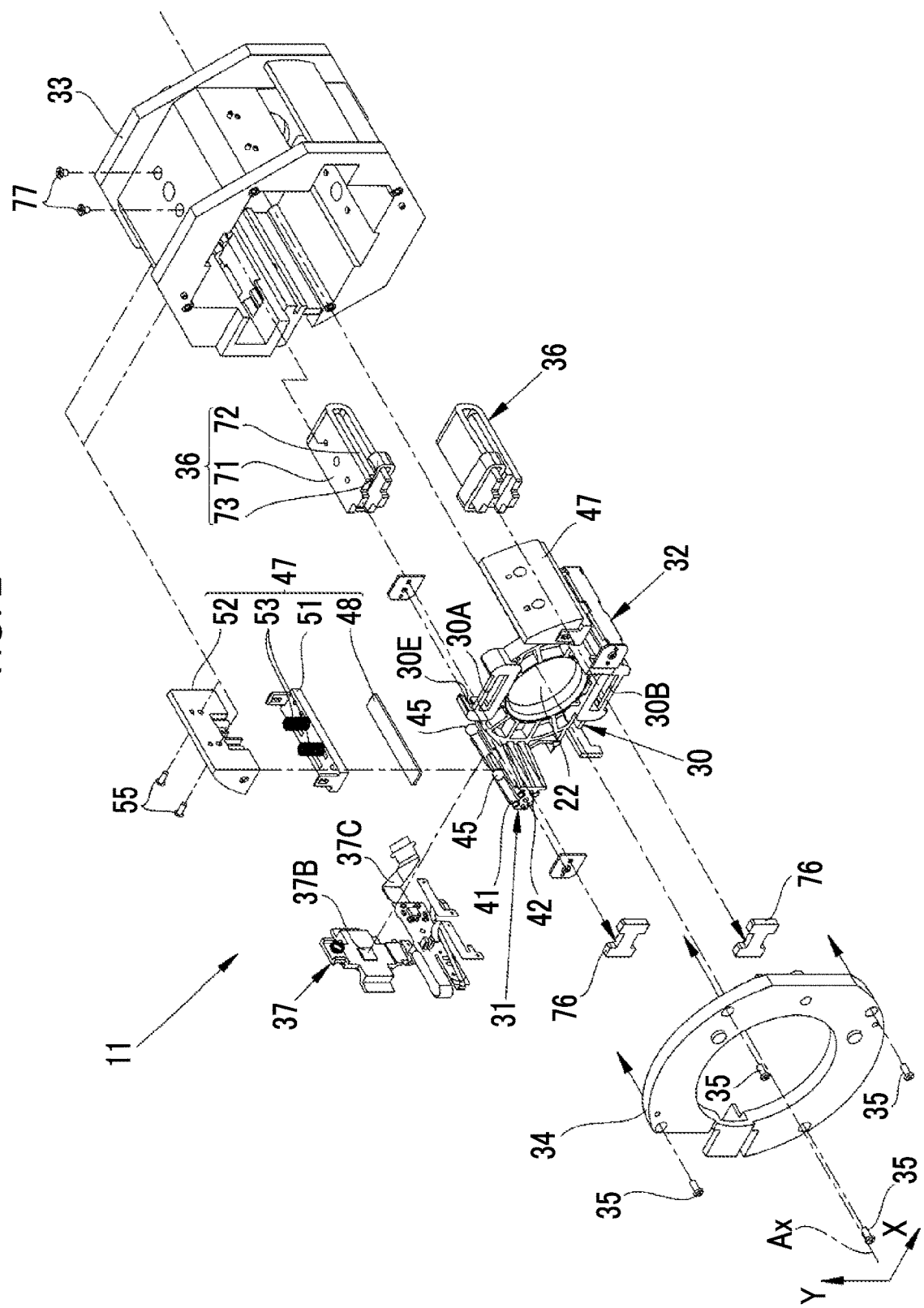
FIG. 2 is a detailed exploded perspective view of a lens moving device according to the embodiment of the invention.
Figure 3:
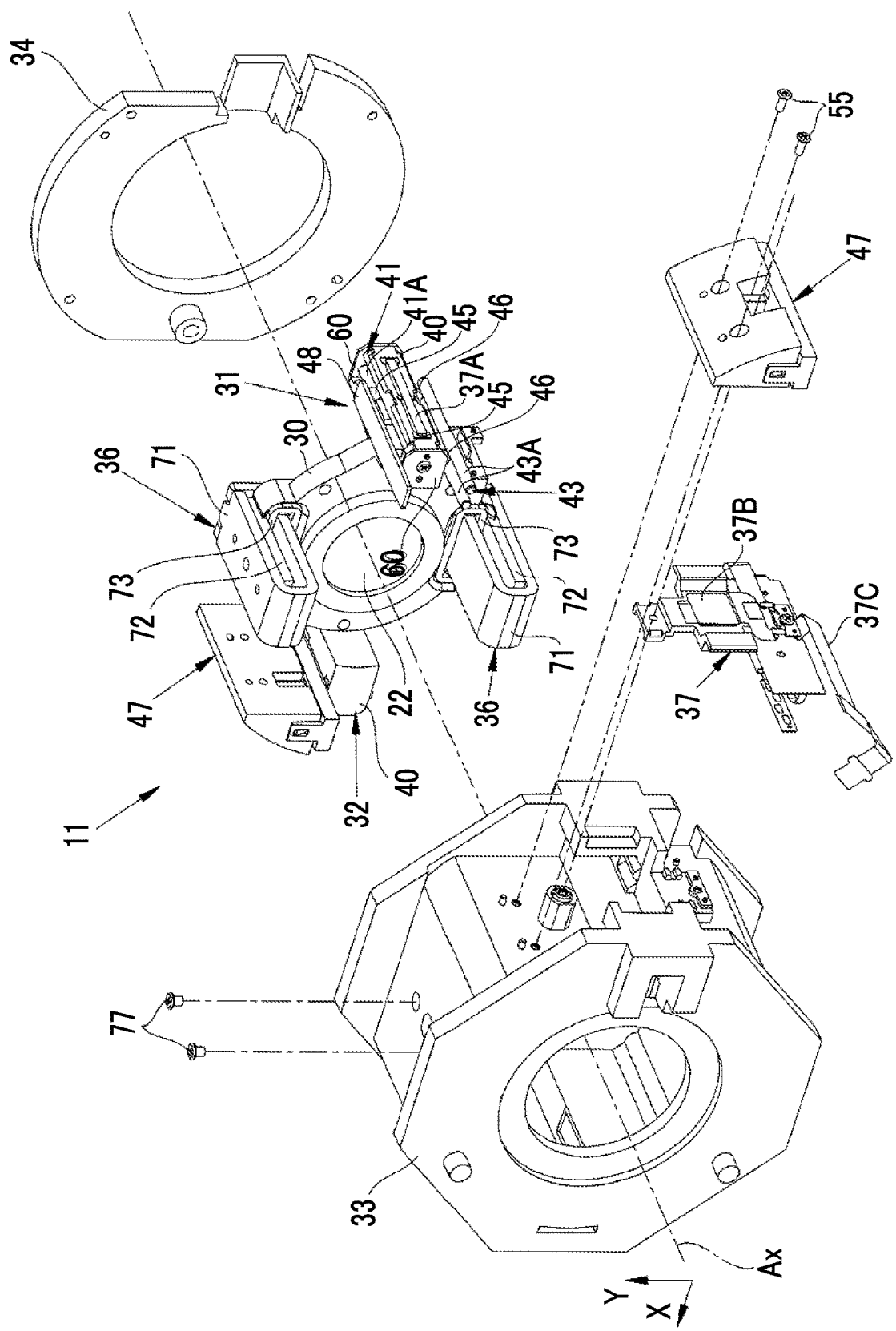
FIG. 3 is a rough exploded perspective view of the lens moving device according to the embodiment of the invention.

The first lens moving device 11 comprises a lens guide device 10 and a lens driving mechanism. As shown in FIGS. 2 and 3, the lens guide device 10 includes the lens frame 30, a first guide unit 31, a second guide unit 32, a holding barrel 33, a base plate 34, and mounting screws 35. The lens driving mechanism includes a pair of voice coil motors (VCMs) 36 and a position sensor 37 for focusing.

Figure 4:
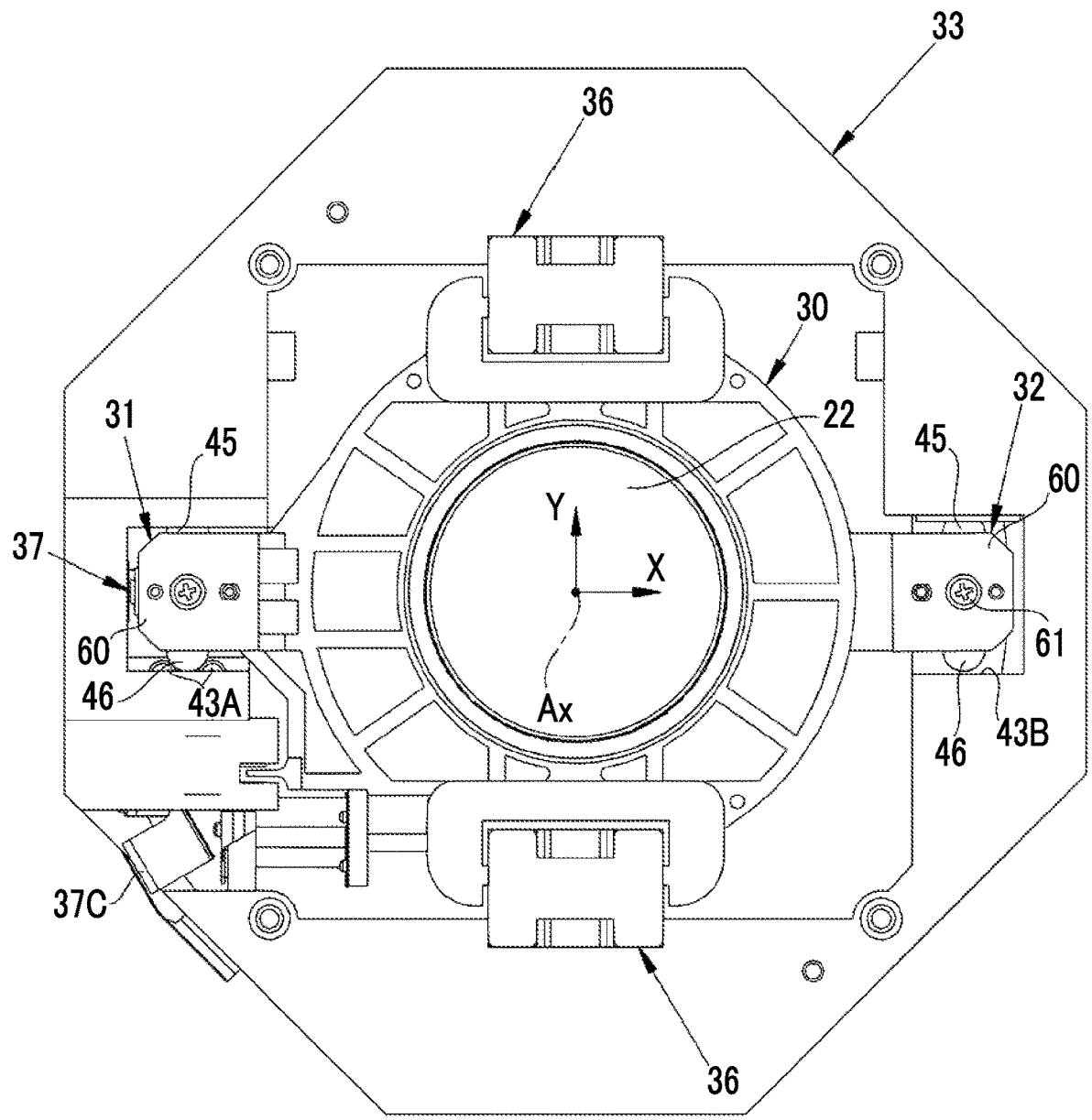
FIG. 4 is a vertical exploded perspective view of a lens guide device according to the embodiment of the invention.

The first focus lens 22 is mounted on the lens frame 30. The lens frame 30 is held inside the holding barrel 33 by the first guide unit 31 and the second guide unit 32. As shown in FIG. 4, the first guide unit 31 is formed on the left side of the lens frame 30 and the second guide unit 32 is formed on the right side of the lens frame 30 when the lens frame 30 is viewed from the base plate 34 in the optical axis direction.

The first guide unit 31 and the second guide unit 32 guide the lens frame 30 so as to allow the lens frame 30 to be movable in the optical axis direction of the first focus lens 22. For the convenience of description, for example, a horizontal direction is referred to as an X direction and a vertical direction is referred to as a Y direction as shown in FIGS. 2 to 4 when a plane orthogonal to the optical axis direction is viewed in the optical axis direction. Further, the plane orthogonal to the optical axis direction is referred to as an XY plane.

Figure 5:
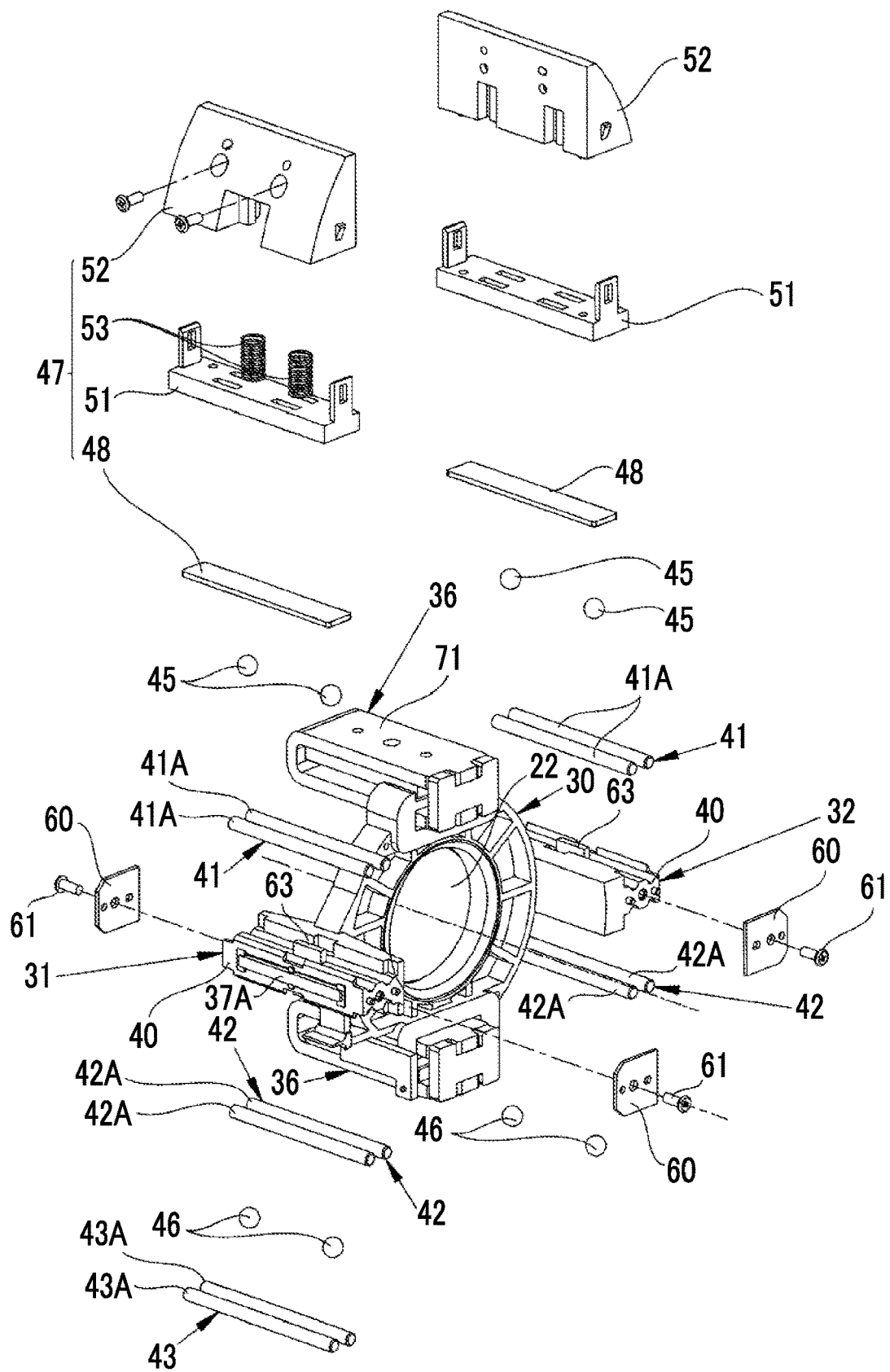
FIG. 5 is a vertical exploded perspective view of the lens guide device according to the embodiment of the invention.

As shown in FIG. 5, each of the first guide unit 31 and the second guide unit 32 includes a guide frame 40, a first rail 41 as a first guide member, a second rail 42 as a second guide member, a third rail 43 as a third guide member, a biasing plate 48 as a fourth guide member, a first rolling body 45, a second rolling body 46, and an biasing mechanism 47. In the second guide unit 32, a flat surface 43B is formed instead of the third rail 43 so as to simplify the structure. However, the third rail 43 may be used as in e the first guide unit 31.

When the lens frame 30 is viewed from the base plate 34 side in the optical axis direction, the first rail 41 is housed on the upper portion of the guide frame 40, and the second rail 42 is housed on the lower portion of the guide frame 40 in parallel with the optical axis direction. A first rolling body 45 is placed on the first rail 41. The first rolling body 45 is formed of two spheres made of metal or ceramic, and rolls along the first rail 41. The second rail 42 is parallel to the first rail 41 and is provided on the guide frame 40 on the side opposite to the first rolling body 45 so as to be close to the first rail 41.

The biasing mechanism 47 is provided over the first rolling body 45 in parallel to the first rail 41. The biasing mechanism 47 is screwed in the holding barrel 33 by mounting screws 55. The biasing mechanism 47 supports the first rolling body 45 so as to allow the first rolling body 45 to be movable in the first direction, and biases the first rolling body 45 in a second direction toward the first rail 41. The second direction is a vertical direction which is orthogonal to the first direction and in which the first rail 41 and the second rail 42 are arranged.

The biasing mechanism 47 includes a biasing frame 51, a mounting frame 52, a pair of coil springs 53, and the mounting screws 55. The biasing mechanism 47 biases the biasing plate (flat plate-like guide member) 48 as the fourth guide member toward the first rolling body 45. The biasing frame 51 has mounting pieces 51A at both ends, and an elongated hole 51B elongated in the vertical direction is formed in the mounting piece 51A. Locking protrusions 52A protrude from both end surfaces of the mounting frame 52. By engaging the locking protrusions 52A in the elongated holes 51B, the biasing frame 51 is movably held in the vertical direction within the mounting frame 52.

Figure 6:
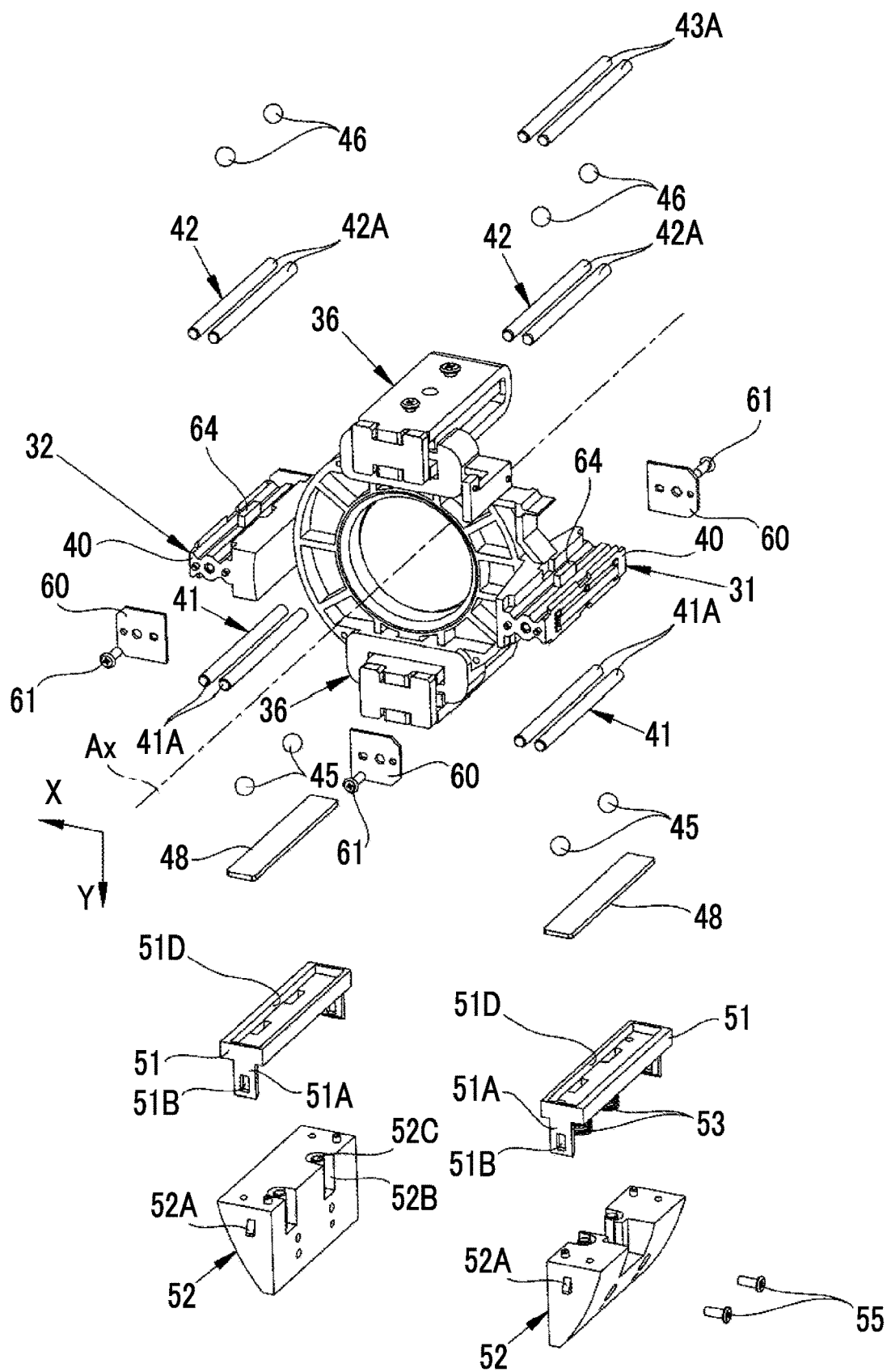
FIG. 6 is a vertical exploded perspective view of a biasing mechanism that is vertically inverted.

As shown in FIG. 6, a housing groove 51D for the first rolling body 45 is formed on a lower surface 51C of the biasing frame 51 (FIG. 6 shows a state when the biasing mechanism 47 is viewed from the bottom and the biasing mechanism 47 is vertically inverted). The housing groove 51D has a rectangular shape, and is formed to extend in the first direction so as to correspond to the first rail 41 (see FIG. 2). The biasing plate 48 made of metal is provided in the housing groove 51D. The biasing plate 48 is in contact with the first rolling body 45.

To bias the biasing frame 51 downward, a pair of spring-housing holes 52B is formed in the mounting frame 52. Guide shafts 52C are provided in the spring-housing holes 52B, respectively. The coil springs 53 are housed in the spring-housing holes 52B and the guide shafts 52C are inserted into the coil springs 53, respectively. The distal ends of the guide shafts 52C are fitted to guide holes 51E of the biasing frame 51, respectively.

Figure 7:
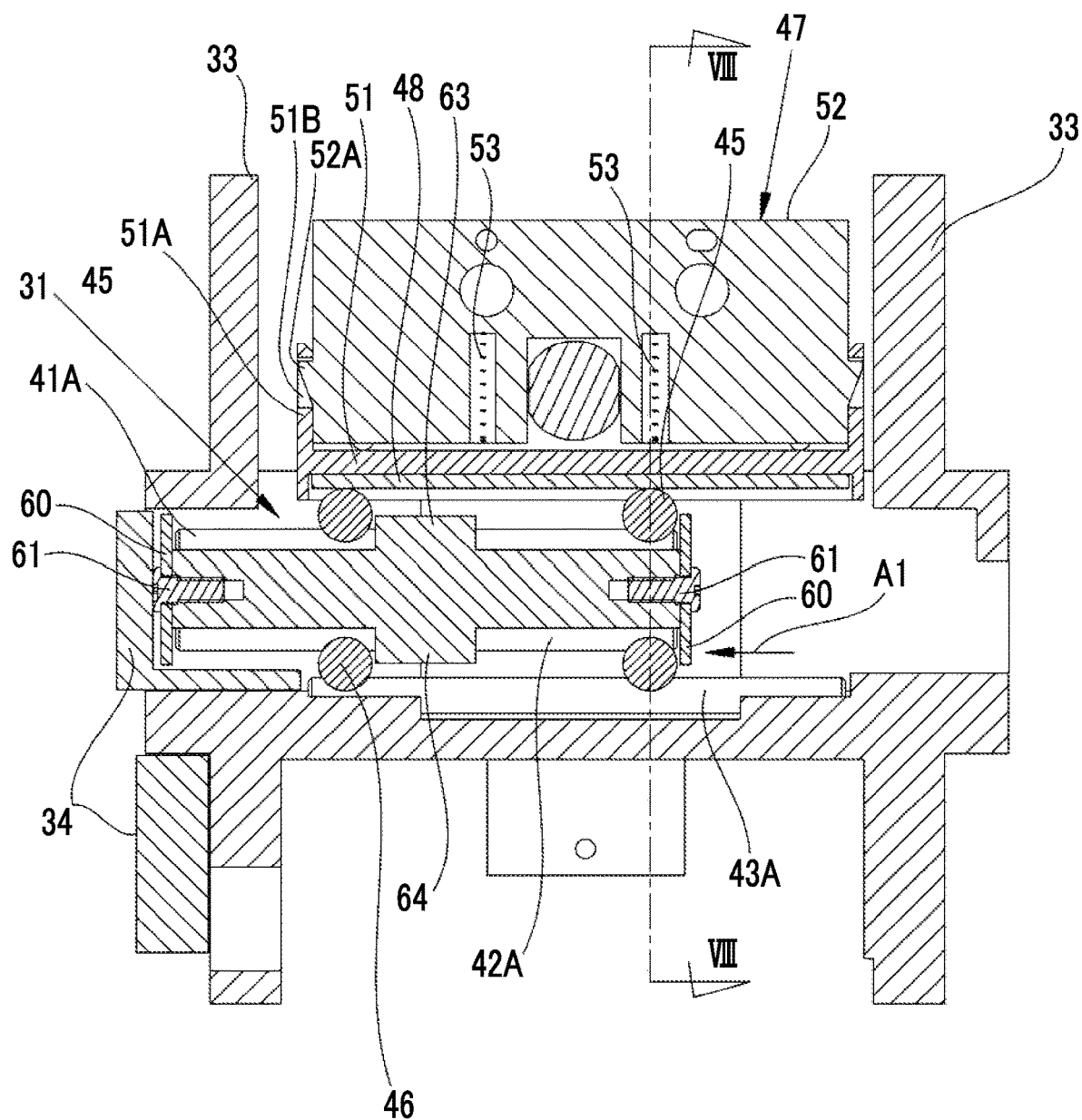
FIG. 7 is a cross-sectional view of the lens guide device.

As shown in FIG. 7, the second rolling body 46 formed of two spheres made of metal or ceramic is in contact with a lower side of the second rail 42. The second rolling body 46 is placed on the third rail 43 and rolls on the third rail 43.

As shown in FIGS. 5 and 6, the first rail 41 is formed of two guide shafts 41A that are made of metal and are arranged in the horizontal direction. Likewise, the second rail 42 is also formed of two guide shafts 42A that are made of metal and are arranged in the horizontal direction, and the third rail 43 is also formed of two guide shafts 43A that are made of metal and are arranged in the horizontal direction. The pair of guide shafts 41A, the pair of guide shafts 42A, and the pair of guide shafts 43A are spaced from each other with an interval therebetween so that the first rolling bodies 45 and the second rolling bodies 46 are not dropped off.

Stoppers 60 made of metal are screwed in both ends of the guide frame 40 in the first direction with mounting screws 61. The stopper 60 prevents the first rail 41, the second rail 42, the rolling body 45, and the rolling body 46 from being dropped off from the guide frame 40.

As shown in FIGS. 5 to 7, a first restricting protrusion 63 is formed so as to protrude upward from a gap between the respective guide shafts 41A of the first rail 41. The first restricting protrusions 63 restrict the rolling of the first rolling body 45 beyond a predetermined range on the first rail 41.

Similarly, a second restricting protrusion 64 is formed so as to protrude upward from a gap between the respective guide shafts 42A of the second rail 42. The second restricting protrusions 64 restrict the rolling of the second rolling body 46 beyond a predetermined range on the second rail 42.

The restricting protrusion 63 returns the rolling bodies 45 to the reference position, and the restricting protrusion 64 returns the rolling bodies 46 to the reference position. For example, the rolling position of the first rolling bodies 45 on the first rail 41 and the rolling positions of the second rolling bodies 46 on the second rail 42 may be shifted due to fall, other impacts, or the like. In this case, when the lens frame 30 returns to the reference position (for example, a first end close to the object side) as shown in FIG. 7 by an arrow A1, the first restricting protrusion 63 and the stopper 60 push the first rolling bodies 45 and return the first rolling bodies 45 to the reference position. Further, when the lens frame 30 returns to the reference position, the second restricting protrusion 64 and the stopper 60 push the second rolling bodies 46 and return second rolling bodies 46 to the reference position. The stopper 60 also functions as a restricting protrusion. Furthermore, the end surfaces on both sides of the housing groove 51D of the biasing frame 51 and the end surfaces holding both ends of the second rail 42 prevent each rolling body 45 and 46 from being separated.

Openings 30A and 30B where the VCMs 36 are to be mounted are formed at upper and lower portions of the lens frame 30 as shown in FIG. 2 when the lens frame 30 is viewed from the base plate 34 in the optical axis direction.

Figure 9:
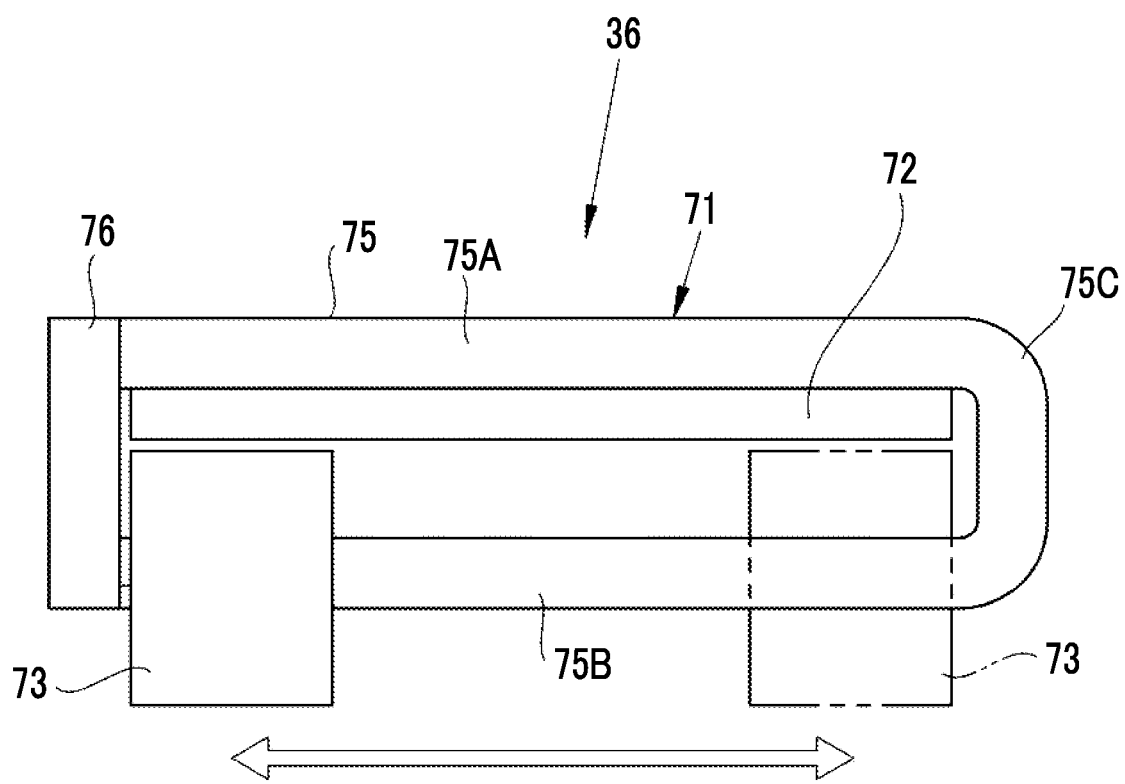
FIG. 9 is a side view of a VCM.

The VCM 36 comprises a yoke 71, a magnet 72, and a coil 73. The yoke 71 is made of a magnetic material, such as iron, and includes a yoke body 75 and a connecting plate 76 as shown in FIG. 9. The yoke body 75 includes an outer yoke 75A and an inner yoke 75B that are provided in parallel with each other so as to face each other with a gap therebetween and are connected to each other by a connecting portion 75C, and is formed in a U shape when the yoke body 75 is viewed from a side surface. A connecting plate 76 is connected to the other end of the yoke 71 to form a closed-loop magnetic circuit. Magnetic flux crossing the coil 73 can be increased by the closed-loop magnetic circuit.

The outer yoke 75A functions as a magnet holding part, and the inner yoke 75B functions as a coil insertion part. The magnet 72 is fixed to the inner surface of the outer yoke 75A. Further, the coil 73 is movably inserted into the inner yoke 75B. The coil 73 is an air-core coil that is formed by the winding of a strand, such as a copper wire.

The coil 73 is moved along the inner yoke 75B by the flow of a current in a magnetic field that is generated by the magnet 72. The position of the coil 73 shown by a solid line is a start end (reference position) in a moving direction, and the position of the coil 73 shown by a two-dot chain line is a terminal end in the moving direction. The outer yoke 75A is fixed to the inner peripheral surface of the holding barrel 33 by mounting screws 77 (see FIG. 2).

As shown in FIG. 2, coil-housing portions 30E are formed around the openings 30A and 30B of the lens frame 30. As shown in FIG. 3, the inner yokes 75B are inserted into the openings 30A and 30B. The coils 73 are housed in the coil-housing portions 30E. After the inner yokes 75B are inserted into the openings 30A and 30B, the outer and inner yokes 75A and 75B and the connecting plate 76 are integrated.

In a case where a current flows in the coil 73, the coil 73 is moved along the inner yoke 75B as shown in FIG. 9. The lens frame 30 holding the coils 73 is moved due to the movement of the coils 73. The first focus lens 22 is set to a predetermined position in the optical axis direction due to the movement of the lens frame 30, so that focusing is performed.

As shown in FIGS. 2 and 3, the position sensor 37 for focusing detects the position of the lens frame 30 in the optical axis direction. The position sensor 37 for focusing includes a rod-like position detection magnet 37A and a magnetic sensor 37B. The position detection magnet 37A is mounted on the guide frame 40 of the lens frame 30. For example, a GMR element, which uses a giant magneto resistive effect (GMR), is used as the magnetic sensor 37B. The magnetic sensor 37B is mounted on the holding barrel 33. Accordingly, the magnetic sensor 37B detects the magnetism of the position detection magnet 37A and outputs a detection signal corresponding to the intensity of the magnetism.

An output signal of the magnetic sensor 37B is sent to the control unit 26 of the camera body 16 through a flexible substrate 37C (see FIG. 2) and the like. In the control unit 26, the position of the lens frame 30 in the optical axis direction is detected on the basis of a signal of the position sensor 37 for focusing and the first focus lens 22 is moved to a desired position by the first lens moving device 11 to perform focusing.

As shown in FIG. 1, the second lens moving device 12 has the same structure as the first lens moving device 11 except that the second focus lens 24 is mounted on the lens frame 30 instead of the first focus lens 22. For this reason, the same components will be denoted by the same reference numerals and the repeated description thereof will be omitted. A direction where the second lens moving device 12 is to be mounted and a direction where the first lens moving device 11 is to be mounted are opposite to each other in a front-back direction, but may be set to the same direction.

The stop mechanism 27 and the vibration-proof mechanism 28 are mounted between the first and second lens moving devices 11 and 12. The stop mechanism 27 includes a stop leaf blade 27A that is provided on the optical axis Ax. The diameter of a stop opening formed by the stop leaf blade 27A is increased or reduced, so that the amount of imaging light to be incident on the camera body 16 is adjusted.

The vibration-proof mechanism 28 displaces the blur-correction lens 23 in an XY plane in a direction, where the blur of an image is canceled, by an X-direction VCM and a Y-direction VCM (not shown). Accordingly, image blur is corrected.

Next, the action of the imaging apparatus 14 of this embodiment will be described. In a case in which imaging is started by a release operation, the first and second lens moving devices 11 and 12 are operated. By this operation, the first and second focus lenses 22 and 24 are moved in the optical axis direction and focusing control is performed. Since the focusing control of the plurality of focus lenses 22 and 24 is performed by the first and second lens moving devices 11 and 12 as described above, a lens-moving distance is distributed. Accordingly, quick focusing can be performed. Particularly, since the plurality of focus lenses 22 and 24 are moved, quick and accurate focusing can be performed in macro imaging. Further, in a case in which the shake of the imaging apparatus 14 is detected, the vibration-proof mechanism 28 is operated and moves the blur-correction lens 23 in the XY plane. Accordingly, image blur is corrected.

In a case where the VCMs 36 are driven, the lens frame 30 is moved in the optical axis direction through the coils 73. The movement of the lens frame 30 is performed while the rolling bodies 45 and 46 are in contact with the first and second rails 41 and 42 provided on the lens frame 30. As shown in FIGS. 5 to 8, the rolling bodies 45 and 46 are biased by the biasing mechanism 47 and the third rail 43 so as to be in contact with the first and second rails 41 and 42. Accordingly, the first and second rails 41 and 42 are sandwiched in the vertical direction by the first and second rolling bodies 45 and 46. Therefore, gaps for sliding do not need to be provided between the first and second rails 41 and 42 and the first and second rolling bodies 45 and 46 that guide the lens frame 30. Accordingly, the lens frame 30 can be smoothly moved in the optical axis direction without rattling.

Figure 14:
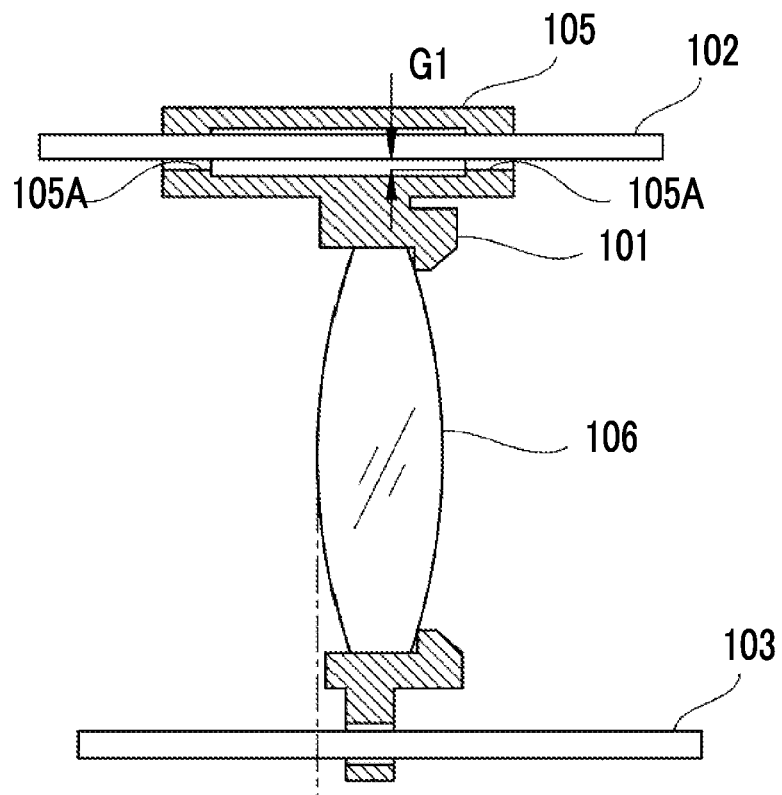
FIG. 14(A) and FIG. 14(B) are cross-sectional views showing the position shift of a lens that is caused by a fitting rattling of a lens guide device in the related art.
Figure 14:
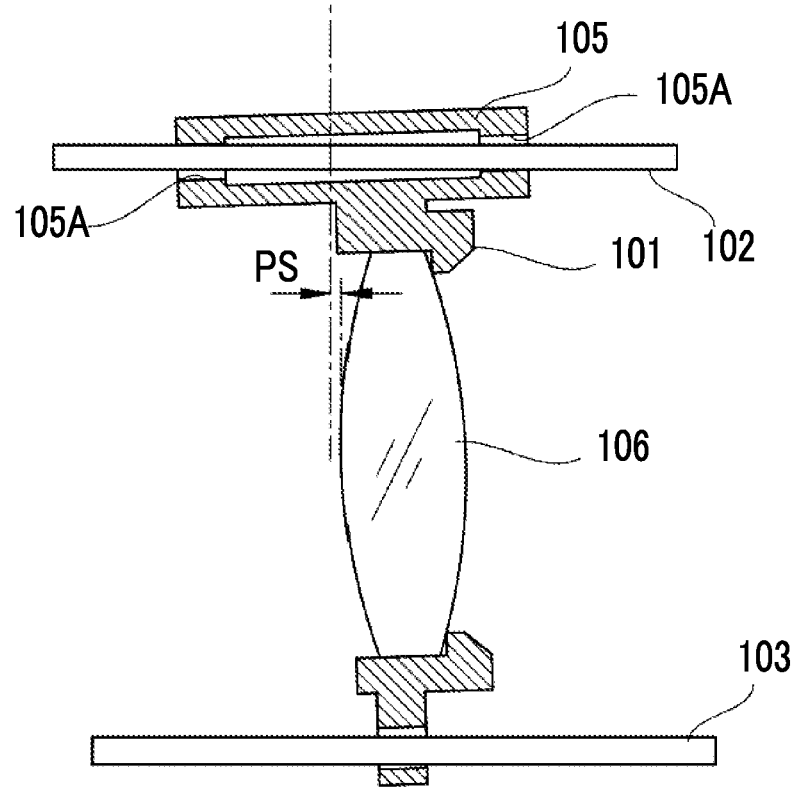

Further, since the amount PS of shift in the stop position of the lens, which is caused by an inclination of a lens frame 101 at the time of movement of the lens frame 101 as in the related art shown in FIG. 14(B), is not generated, the position of the first focus lens 22 is not shifted on the optical axis in a state immediately after movement and in a subsequent stop state. Accordingly, the first focus lens 22 can be accurately stopped at a target position. Therefore, focusing can be accurately performed.

In the present embodiment, the lens frame 30 is guided in the optical axis direction by the first guide unit 31 and the second guide unit 32 using the rolling bodies 45 and 46. Therefore, the movement resistance is lower than that in a case of the slide of the guide groove on the guide rod as in the related art. Accordingly, the lens frame 30 can be more smoothly guided.

Initialization for returning the lens frame 30 to the reference position, which is one end of the predetermined range, is performed by the lens driving mechanism, so that the first rolling bodies 45 can be locked by the restricting protrusion 63 and the stopper 60 and the second rolling bodies 46 can be locked by the restricting protrusion 64 and the stopper 60 through the initialization. Since the rolling bodies 45 and 46 roll on the respective rails 41 to 43 and the biasing plate 48, the relative positions of the respective rolling bodies 45 and 46 on the respective rails 41 to 43 and the biasing plate 48 are not changed originally. However, even in a case where the positions of the respective rolling bodies 45 and 46 on the rails 41 to 43 and the biasing plate 48 are shifted due to fall or other impacts, the respective rolling bodies 45 and 46 can be reliably returned to the reference positions by the initialization.

A sphere made of metal or ceramic is used as the rolling bodies 45 and 46, but a sphere made of a hard synthetic resin, a sphere, which is made of a synthetic resin and of which the surface is subjected to hard plating, and the like can be used as the rolling body other than this. Since a sphere made of ceramic is lightweight and has an advantage of not being affected by a magnetic force, the sphere made of ceramic is more preferably used. Further, in the case of a sphere made of metal, particularly, in the case of a sphere made of a magnetic material responding to a magnetic force, there is a concern that the drive performance of the sphere may deteriorate due to the influence of the magnetic field of the magnet. For this reason, a sphere made of non-magnetic stainless steel (SUS) is used. The sphere made of a magnetic material is used in a state where a distance between the magnet and the sphere is sufficiently ensured and an influence of a magnetic field is removed or reduced. Further, it is preferable that the biasing plate 48, the guide shafts 41A, 42A, and 43A, and the stoppers 60 made of metal other than the rolling bodies are also made of non-magnetic stainless steel (SUS), a hard synthetic resin, a synthetic resin of which the surface is subjected to hard plating, or the like.

Focusing control is performed using the two lens moving devices 11 and 12, but focusing control may be performed using one lens moving device 11.

First Modification Example

Figure 10:
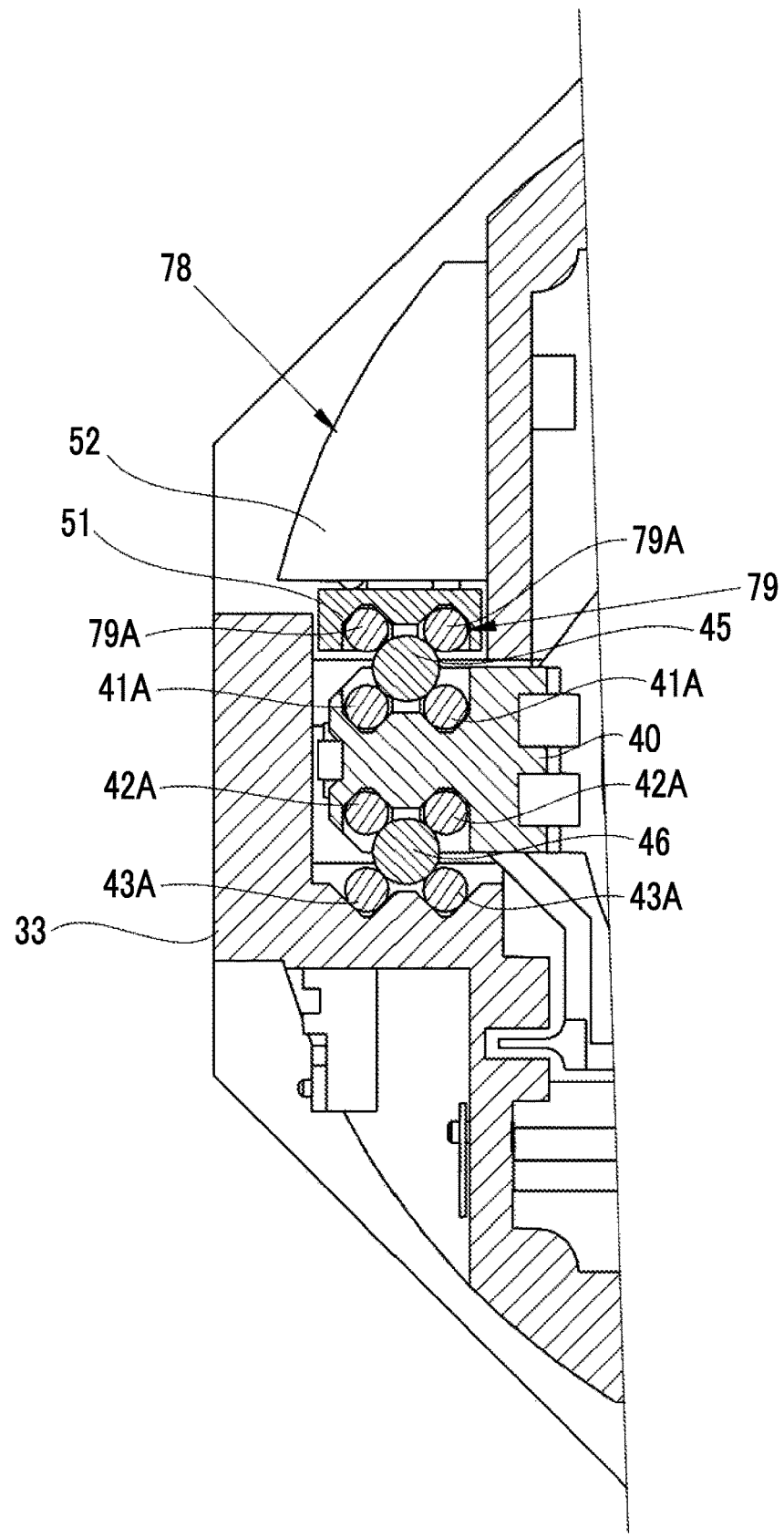
FIG. 10 is a cross-sectional view showing a first modification example of the biasing mechanism that uses a guide rail instead of a biasing plate.

As shown in FIG. 7, in the first embodiment, the first rolling bodies 45 are held so as to be sandwiched by the biasing plate 48 formed of a flat plate and the first rail 41. On the other hand, the second rolling bodies 46 are sandwiched by the second and third rails 42 and 43. For this reason, since the first rolling bodies 45 and the second rolling bodies 46 have the same diameter but have different contact positions, the rolling diameters of the first rolling bodies 45 are different from the rolling diameters of the second rolling bodies 46. Accordingly, for example, the first rolling body 45 not only rolls but also slips. A biasing mechanism 78, which includes a guide rail 79 formed of a pair of guide shafts 79A instead of the biasing plate 48, is used to avoid this in the first modification example shown in FIG. 10. In this first modification example, the first rolling bodies 45 and the second rolling bodies 46 have the same rolling diameter. Accordingly, for example, the slide of the first rolling body 45 is suppressed, so that the lens frame 30 can be more smoothly moved. In the description of each modification example and each embodiment, the same components as those of the first embodiment will be denoted by the same reference numerals as those of the first embodiment and the repeated description thereof will be omitted.

Second Modification Example

Figure 11:
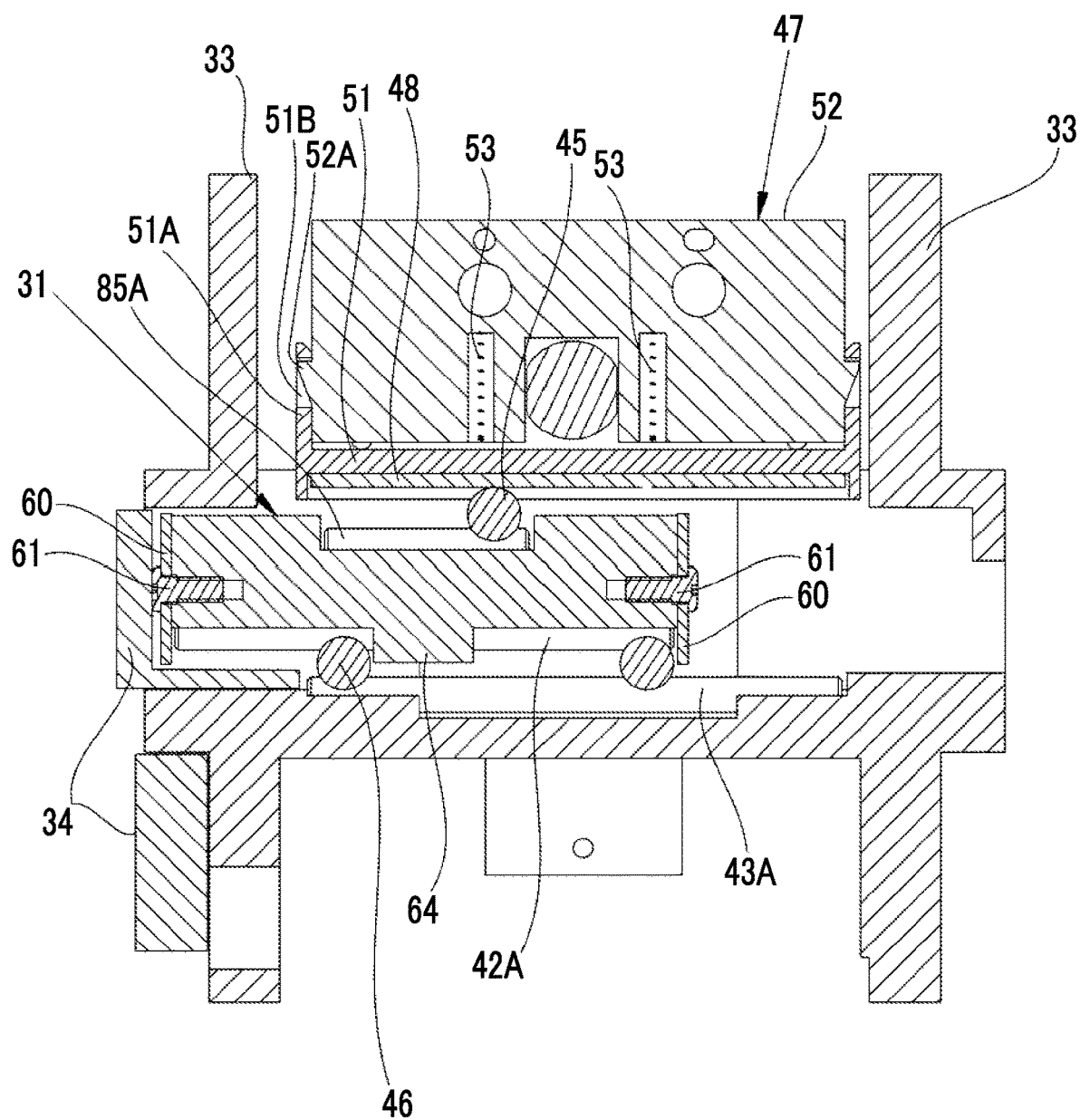
FIG. 11 is a cross-sectional view showing a second modification example of the lens guide device using one first rolling body.

In the first embodiment shown in FIG. 7, two first rolling bodies 45 and two second rolling bodies 46 are used, but as in the second modification example shown in FIG. 11, one first rolling body 45 may be used. In this case, the length of the guide shaft 85A of the first rail is set according to the rolling distance of the first rolling body 45.

Third Modification Example

Figure 8:
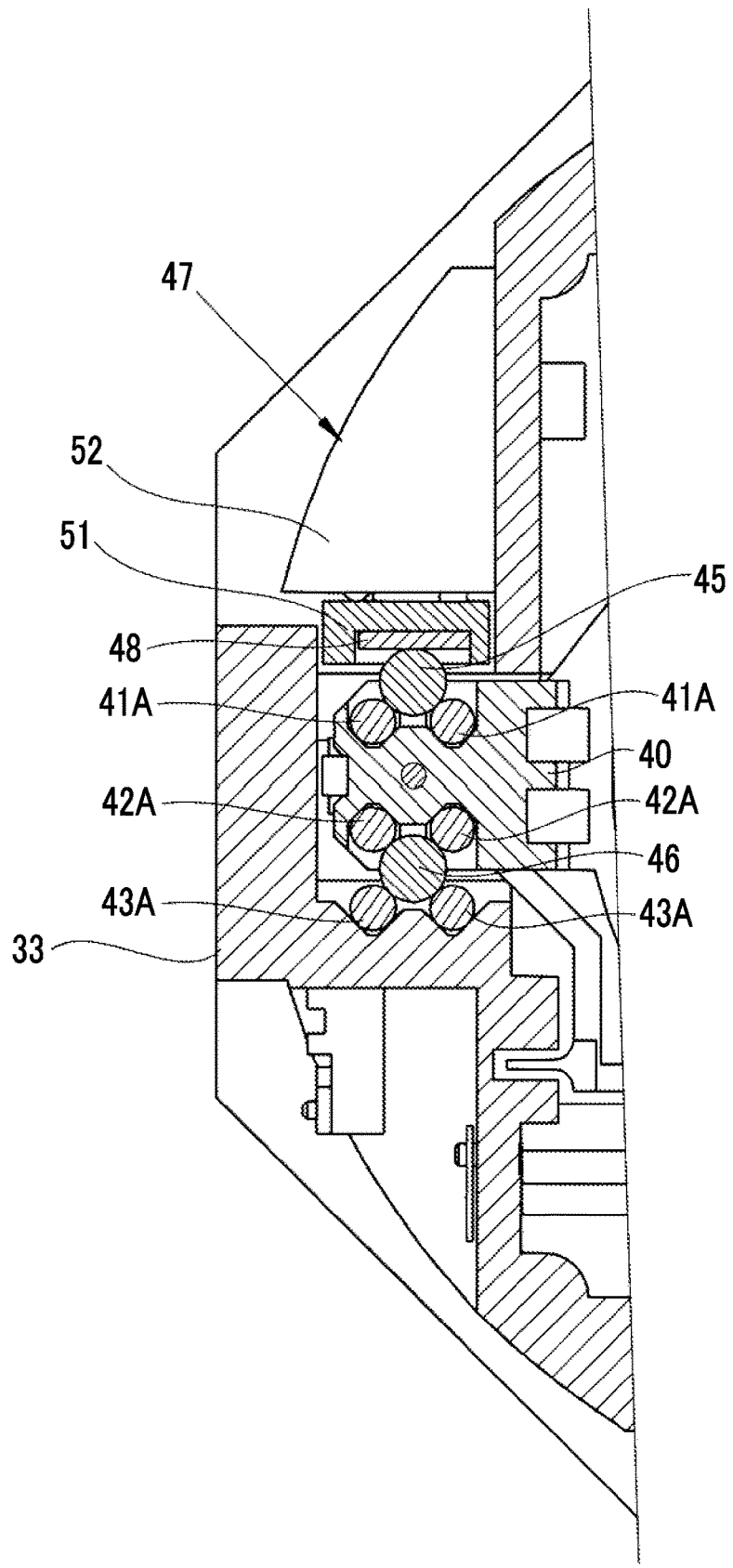
FIG. 8 is a cross-sectional view taken along line VIII-VIII of FIG. 7.
Figure 12:
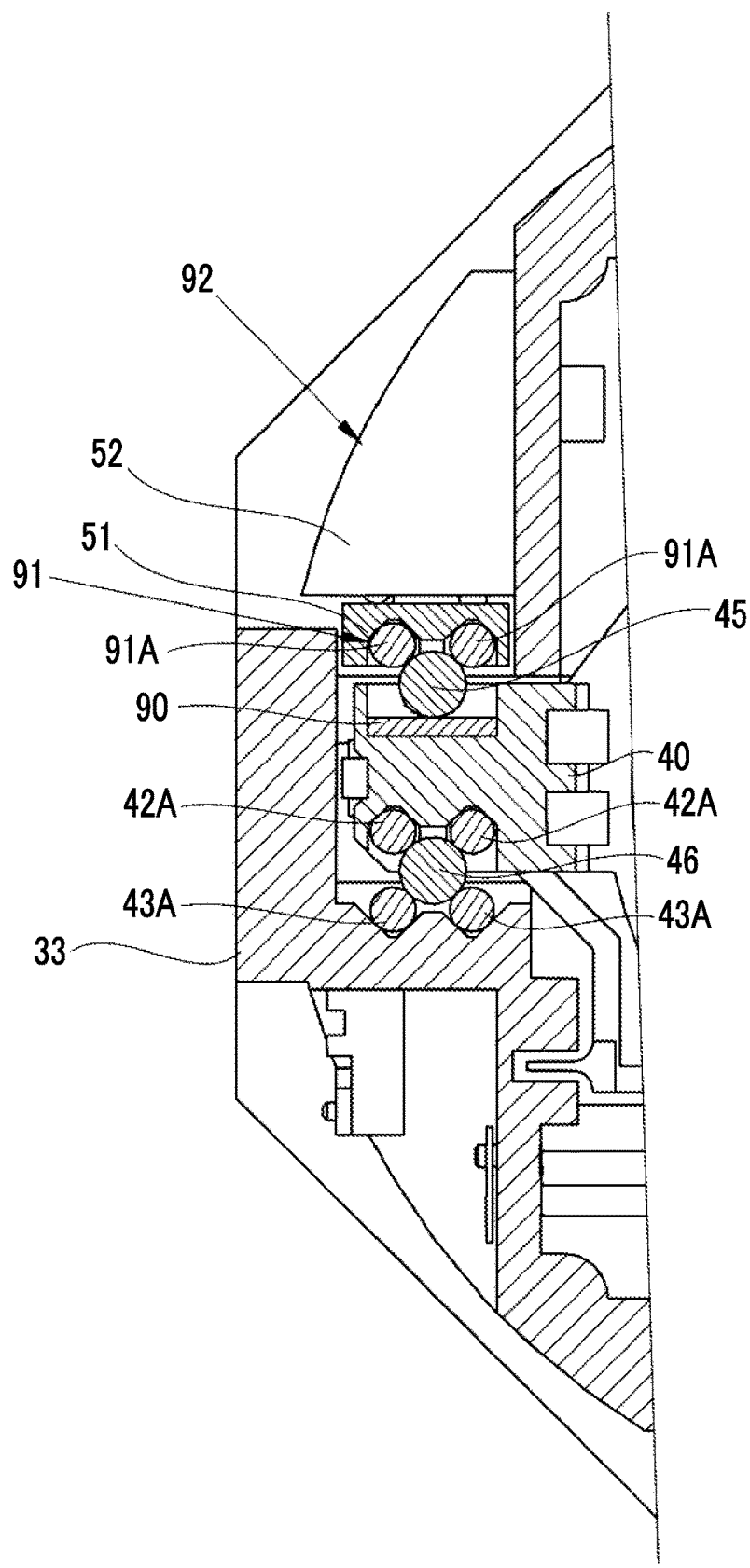
FIG. 12 is a cross-sectional view showing the second modification example of the biasing mechanism where the biasing plate and a first rail of the first embodiment are disposed so as to be vertically inverted.

As shown in FIG. 8, in the first embodiment, the first rolling bodies 45 is held so as to be sandwiched by the first rail 41 and the biasing plate 48 formed of a flat plate. In contrast, in the third modification example shown in FIG. 12, the first rail 41 and the biasing plate 48 (see FIG. 7) of the first embodiment are disposed so as to be vertically inverted, a biasing plate 90 is used as a first guide member, and a first rail 91 is used as a fourth guide member. The first rail 91 is formed of two parallel guide shafts 91A. The first rail 91 is biased downward by a biasing mechanism 92. The biasing mechanism 92 has substantially the same structure as the biasing mechanism 47 of the first embodiment. Even in this case, as in the first embodiment, the lens frame 30 can be smoothly moved in the optical axis direction without rattling. Accordingly, the first focus lens 22 can be accurately stopped at a target position, so that focusing can be accurately performed.

In the first embodiment and the first to third modification examples, the first rolling bodies 45 are biased toward the second rolling bodies 46 by the biasing mechanisms 47 and 78 (first biasing mechanisms). However, instead of or in addition to this, the second rolling bodies 46 may be biased toward the first rolling body 45 by a second biasing mechanism. Although not shown, the second biasing mechanism has the same structure as the first biasing mechanisms 47 and 78. Further, each of the biasing mechanism 47 and 78 is provided in the holding barrel 33, but may be provided in the guide frame 40 instead of this. Although not shown, a guide member with a guide groove may be used instead of the biasing plates 48 and 90 as a flat plate-like guide member. The guide member with a guide groove includes a guide groove that is formed in the first direction on the guide surface of a guide block having the shape of a rectangular parallelepiped and has a V-shaped cross section. Rolling bodies are movably put in the guide groove.

In addition to third modification example 3, at least one of the first guide member, the second guide member, the third guide member, or the fourth guide member may be a flat plate-like guide member or a guide member with a guide groove. Also, the other guide members use two parallel guide shafts. In this case as well, the lens frame 30 can be smoothly guided.

Second Embodiment

Figure 13:
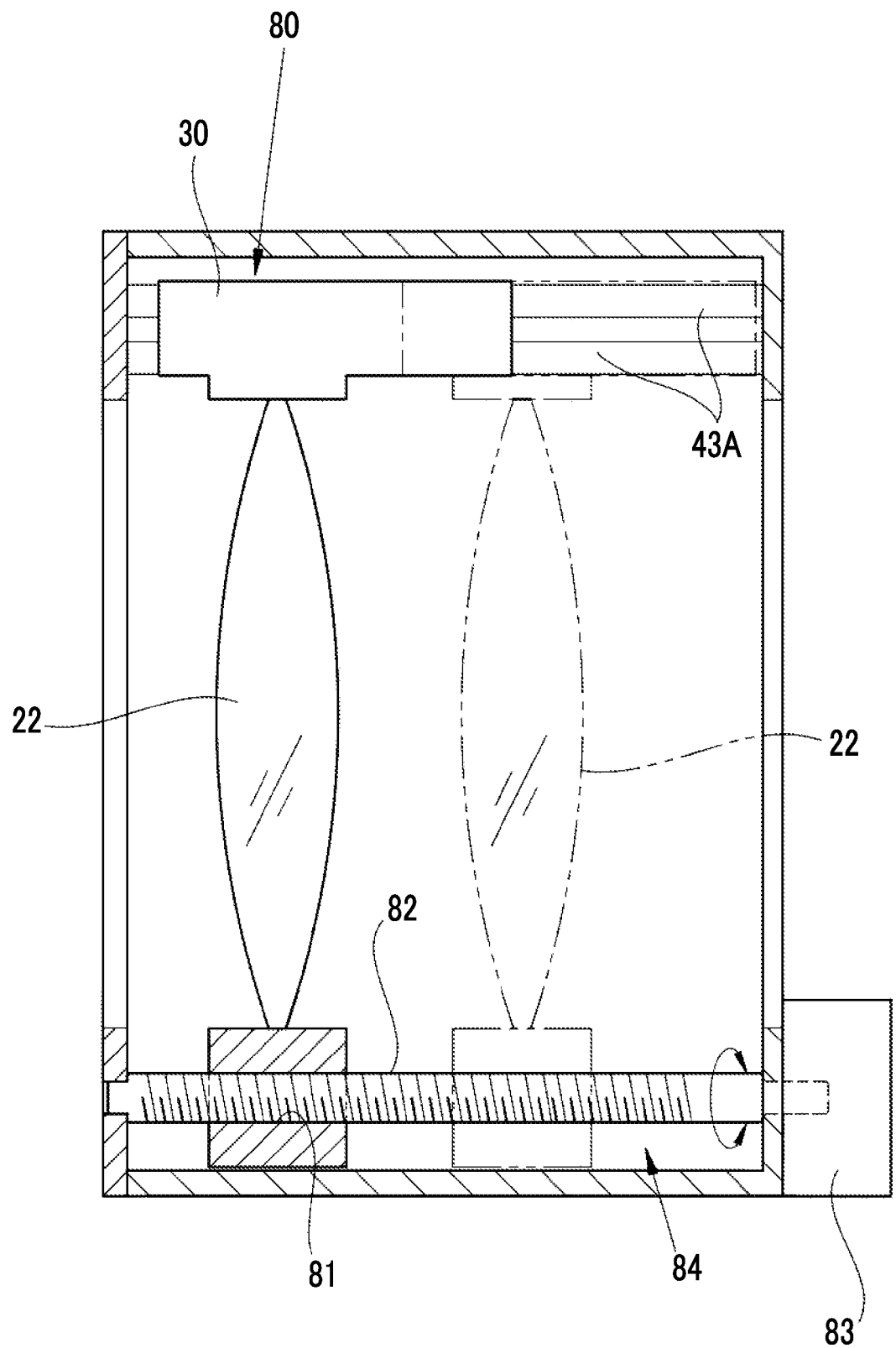
FIG. 13 is a cross-sectional view of a lens moving device of a second embodiment that uses a stepping motor instead of a VCM.

The lens driving mechanism includes the VCMs 36 in the first embodiment, but a lens driving mechanism 84 may include a female screw portion 81, a screw rod 82, and a stepping motor 83 as in a lens moving device 80 of the second embodiment shown in FIG. 13 instead of this. In this case, the lens frame 30 is provided with the female screw portion 81. Then, the screw rod 82 is screwed with the female screw portion 81. Furthermore, the screw rod 82 is rotated by the stepping motor 83. The screw rod 82 is rotated in a normal direction or a reverse direction, so that the lens frame 30 including the female screw portion 81 can be accurately positioned at a predetermined position in the optical axis direction.

The lens moving devices 11 and 12 and the lens guide device 10 according to the embodiments of the invention are used for focusing control, and are also used for the movement of lenses of a zoom device or other optical devices.

EXPLANATION OF REFERENCES

- 10: lens guide device
- 11: first lens moving device
- 12: second lens moving device
- 14: imaging apparatus
- 15: lens unit
- 16: camera body
- 17: imaging element
- 18: connector
- 19: optical system
- 20: lens barrel member
- 21: first lens
- 22: first focus lens
- 23: blur-correction lens
- 24: second focus lens
- 25: fifth lens
- 26: control unit
- 27: stop mechanism
- 27A: stop leaf blade
- 28: vibration-proof mechanism
- 29: focus ring
- 30: lens frame
- 30A, 30B: opening
- 30E: coil-housing portion
- 31: first guide unit
- 32: second guide unit
- 33: holding barrel
- 34: base plate
- 35: mounting screw
- 36: VCM
- 37: position sensor for focusing
- 37A: position detection magnet
- 37B: magnetic sensor
- 37C: flexible substrate
- 40: guide frame
- 41: first rail
- 41A: guide shaft
- 42: second rail
- 42A: guide shaft
- 43: third rail
- 43A: guide shaft
- 43B: flat surface
- 45: first rolling body
- 46: second rolling body
- 47: biasing mechanism
- 48: biasing plate
- 51: biasing frame
- 51A: mounting piece
- 51B: elongated hole
- 51D: housing groove
- 51E: guide hole
- 52: mounting frame
- 52A: locking protrusion
- 52B: spring-housing hole
- 52C: guide shaft
- 53: coil spring
- 55: mounting screw
- 60: stopper
- 61: mounting screw
- 63: first restricting protrusion
- 64: second restricting protrusion
- 67: biasing plate
- 71: yoke
- 72: magnet
- 73: coil
- 75: yoke body
- 75A: outer yoke
- 75B: inner yoke
- 75C: connecting portion
- 76: connecting plate
- 77: mounting screw
- 78: biasing mechanism
- 79: guide rail
- 79A: guide shaft
- 80: lens moving device
- 81: female screw portion
- 82: screw rod
- 83: stepping motor
- 84: lens driving mechanism
- 85A: guide shaft
- 90: biasing plate
- 91: first rail
- 91A: guide shaft
- 92: biasing mechanism
- 101: lens frame
- A1: arrow
- Ax: optical axis
- PS: amount of shift

What is claimed is:

1. A lens guide device comprising:
a lens frame that holds a lens;
a first guide unit that movably supports the lens frame in a first direction parallel to an optical axis of the lens; and
a second guide unit that movably supports the lens frame in the first direction parallel to the optical axis of the lens at a position spaced from the first guide unit,
wherein the first guide unit and the second guide unit include
a first guide member that is provided on the lens frame in the first direction parallel to the optical axis of the lens,
a first rolling body that is moved while being in contact with the first guide member,
a second guide member that is parallel to the first guide member and is provided on the lens frame on a side opposite to the first rolling body so as to be close to the first guide member,
a second rolling body that is moved while being in contact with the second guide member, a third guide member that supports the second rolling body so as to allow the second rolling body to be movable in the first direction and is parallel to the second guide member, a fourth guide member that supports the first rolling body so as to allow the first rolling body to be movable in the first direction and is parallel to the first guide member, and a biasing mechanism that biases one of the first and second rolling bodies toward the other of the first and second rolling bodies.

2. The lens guide device according to claim 1, wherein at least one of the first guide member, the second guide member, the third guide member, or the fourth guide member is a flat plate-like guide member or a guide member with a guide groove, and each of the other guide members is two parallel guide shafts.

3. The lens guide device according to claim 2, wherein one of the first rolling body and the second rolling body is two spheres that are provided so as to be spaced from each other in the first direction, the other of the first rolling body and the second rolling body is at least one sphere that is provided between the two spheres when the first rolling body and the second rolling body are viewed in a second direction that is a direction which is orthogonal to the first direction and in which the first guide member and the second guide member are arranged, and the lens guide device further comprises a restricting protrusion that is provided between the two spheres and restricts the movement of the two spheres beyond a predetermined range in the first direction.

4. The lens guide device according to claim 2, wherein each of the first rolling body and the second rolling body is two spheres that are provided so as to be spaced from each other in the first direction, and the lens guide device further comprises a restricting protrusion that is provided between the two spheres and restricts the movement of the respective spheres beyond a predetermined range in the first direction.

5. The lens guide device according to claim 3, further comprising:

a holding barrel in which the biasing mechanism and the third guide member are provided and which holds the lens frame therein.

6. The lens guide device according to claim 4, further comprising:

a holding barrel in which the biasing mechanism and the third guide member are provided and which holds the lens frame therein.

7. A lens moving device comprising:

the lens guide device according to claim 5; and a lens driving mechanism that is provided in the holding barrel and moves the lens frame in an optical axis direction.

8. The lens moving device according to claim 7, wherein the lens driving mechanism is a voice coil motor or a stepping motor that includes a screw rod screwed with the lens frame.

9. The lens moving device according to claim 8, wherein the lens driving mechanism performs initialization for returning the lens frame to a reference position that is one end of the predetermined range.

10. An imaging apparatus comprising:

an imaging unit; and the lens moving device according to claim 7 that forms an object image on the imaging unit.

11. An imaging apparatus comprising:

an imaging unit; and the lens moving device according to claim 8 that forms an object image on the imaging unit.

12. An imaging apparatus comprising:

an imaging unit; and the lens moving device according to claim 9 that forms an object image on the imaging unit.

* * * * *